United States Patent
Li et al.

(10) Patent No.: US 11,474,972 B2
(45) Date of Patent: Oct. 18, 2022

(54) METADATA QUERY METHOD AND APPARATUS

(71) Applicant: HUAWEI TECHNOLOGIES CO., LTD., Guangdong (CN)

(72) Inventors: Yong Li, Shenzhen (CN); Zhongbing Yang, Shanghai (CN); Yan Tu, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 366 days.

(21) Appl. No.: 16/831,005

(22) Filed: Mar. 26, 2020

(65) Prior Publication Data

US 2020/0226100 A1 Jul. 16, 2020

Related U.S. Application Data

(63) Continuation of application No. PCT/CN2018/105969, filed on Sep. 17, 2018.

(30) Foreign Application Priority Data

Sep. 27, 2017 (CN) .......................... 201710889269.3

(51) Int. Cl.
*G06F 16/14* (2019.01)
*G06F 16/182* (2019.01)
(Continued)

(52) U.S. Cl.
CPC .......... *G06F 16/148* (2019.01); *G06F 16/128* (2019.01); *G06F 16/156* (2019.01); *G06F 16/182* (2019.01); *G06F 16/24554* (2019.01)

(58) Field of Classification Search
CPC .... G06F 16/148; G06F 16/128; G06F 16/156; G06F 16/182; G06F 16/24554
See application file for complete search history.

(56) References Cited

U.S. PATENT DOCUMENTS 7,886,119 B1  2/2011  Cameron et al.
10,198,321 B1 *  2/2019  Gordon ............... G06F 11/1448
(Continued)

FOREIGN PATENT DOCUMENTS

CN  101968755 A  2/2011
CN  103761159 A  4/2014
(Continued)

OTHER PUBLICATIONS

Wei Zhou et al.,"Logical Volume High Performance Snapshot Based on Out-of-Band Storage Virtualization",Journal of Computer Research and Development,dated Mar. 15, 2012,total 10 pages.

(Continued)

*Primary Examiner* — William Spieler
(74) *Attorney, Agent, or Firm* — Womble Bond Dickinson (US) LLP (57) ABSTRACT

In the field of data storage, a metadata query method and an apparatus are disclosed to improve metadata searching efficiency. The method is applied to a linked snapshot. A metadata query request is received. A first time sequence identifier is obtained from the first snapshot volume based on the volume identifier of the first snapshot volume. A historical index information is queried based on the data block identifier and the first time sequence identifier. When the data block identifier exists, and the first time sequence identifier falls within a corresponding query time sequence interval a corresponding target volume identifier is obtained from the historical index information. Address metadata corresponding to the data block identifier are obtained from a second snapshot volume indicated by the target volume identifier.

20 Claims, 5 Drawing Sheets

(51) Int. Cl.
  *G06F 16/2455* (2019.01)
  *G06F 16/11* (2019.01)

(56) References Cited

U.S. PATENT DOCUMENTS

| | | | |
|---|---|---|---|
| 2004/0030951 A1 | 2/2004 | Armangau | |
| 2007/0271431 A1* | 11/2007 | Hwang | G06F 11/1471 |
| | | | 711/162 |
| 2011/0123169 A1* | 5/2011 | Liu | H04N 5/765 |
| | | | 386/E5.003 |
| 2017/0032005 A1 | 2/2017 | Zheng et al. | |

FOREIGN PATENT DOCUMENTS

| | | | |
|---|---|---|---|
| CN | 105677252 A | 6/2016 | |
| CN | 105740469 A | 7/2016 | |
| CN | 106326040 A | 1/2017 | |
| CN | 107179964 A | 9/2017 | |

OTHER PUBLICATIONS

Rushikesh Salunkhe et al.,"In Search of a Scalable File System State-of-the-art File Systems Review and Map view of new Scalable File System.",International Conference on Electrical, Electronics, and Optimization Techniques (ICEEOT)—2016,total 8 pages.

Zhang Xu et al: "BirdStore: Block-grained snapshot management system for instant disaster recovery",Jun. 27, 2014 (Jun. 27, 2014), pp. 800-803,XP032667566.

* cited by examiner

Linked snapshot

| LUNID | SID | TID | Other |
|---|---|---|---|

FIG. 4

| LUNID | P1 | TS1 | P2 | TS2 | P3 | TS3 | P4 | TS4 | Other |
|---|---|---|---|---|---|---|---|---|---|

METADATA QUERY METHOD AND APPARATUS

CROSS-REFERENCE TO RELATED APPLICATIONS

This application is a continuation of International Patent Application No. PCT/CN2018/105969, filed on Sep. 17, 2018, which claims priority to Chinese Patent Application No. 201710889269.3, filed on Sep. 27, 2017. The disclosures of the aforementioned applications are hereby incorporated by reference in their entireties.

TECHNICAL FIELD

Embodiments of the application relate to the field of data storage, and in particular, to a metadata query method and an apparatus.

BACKGROUND

Snapshot is an indispensable function, and almost all cloud storage, such as AWS and Alibaba Cloud, supports the snapshot function. A snapshot provides an image of a system at a time point, and may enable the system to restore to a state at an available time point when the system is faulty. In a cloud scenario, a snapshot volume may reuse data in a base volume, so that overheads of snapshot storage space can be effectively reduced. However, because a quantity of the snapshot volumes is relatively large, an effective snapshot metadata retrieval method is required. Metadata refers to information that is used to describe data attributes of the snapshot volume, and is used to support functions such as storage location indication, historical data indication, resource searching, and file recording.

Currently, some methods, such as snapshot chains, are used to reduce metadata information of a snapshot, for example, a tree-shaped snapshot and a linked snapshot. For the tree-shaped snapshot, a plurality of copies of metadata are required when a snapshot is formed, but a close dependency does not exist between snapshot devices. For the linked snapshot, a small quantity of copies of metadata are required, but a close dependency exists between the snapshot devices. In the linked snapshot, incremental metadata information after a latest snapshot point is recorded in information. Therefore, metadata space is relatively saved. However, the incremental metadata information stored on snapshot metadata does not overwrite all metadata in many cases. A plurality of snapshot volumes and base volumes need to be searched based on a dependency. Consequently, time overheads for searching are relatively large.

SUMMARY

Embodiments of the invention provide a metadata query method and an apparatus, to resolve a prior-art problem that when a plurality of snapshot volumes and base volumes are searched for metadata, time overheads for searching are relatively large, and to improve metadata searching efficiency.

To achieve the foregoing objective, the following technical solutions are used in the embodiments of the invention.

According to at least one embodiment, a metadata query method is provided. The method is applied to a linked snapshot, and includes: receiving a metadata query request, where the metadata query request includes a volume identifier of a first snapshot volume and a data block identifier; obtaining a first time sequence identifier from the first snapshot volume based on the volume identifier of the first snapshot volume, where the first time sequence identifier is used to indicate a creation time sequence of the first snapshot volume; querying historical index information based on the data block identifier and the first time sequence identifier, where the historical index information includes a correspondence between a query data block identifier and historical query snapshot information, and the historical query snapshot information is used to indicate a query volume identifier and a query time sequence interval; and when the data block identifier exists in the historical index information, and the first time sequence identifier falls within a query time sequence interval corresponding to the data block identifier, obtaining a corresponding target volume identifier from the historical index information, and obtaining, from a second snapshot volume indicated by the target volume identifier, address metadata corresponding to the data block identifier.

In the foregoing technical solution, when the metadata query request is received, the historical index information may be first queried, and when the data block identifier exists in the historical index information, and the first time sequence identifier falls within the query time sequence interval corresponding to the data block identifier, the corresponding target volume identifier is obtained from the historical index information, and the address metadata corresponding to the data block identifier is obtained from the second snapshot volume indicated by the target volume identifier. Because the historical index information stores the correspondence between the query data block identifier and the historical query snapshot information, a problem of performing searching level by level according to the prior art may be avoided. In this way, a searching time is reduced and metadata searching efficiency is improved.

In at least one embodiment, the historical query snapshot information includes at least one query volume identifier and a query time sequence identifier and a query hop count that correspond to each query volume identifier, and a query time sequence identifier and a query hop count that correspond to a query volume identifier are used to indicate a query time sequence interval corresponding to the query volume identifier.

In at least one embodiment, before the querying historical index information based on the data block identifier and the first time sequence identifier, the method further includes: querying location identification information based on the data block identifier, where the location identification information is used to indicate a volume location of the address metadata corresponding to the data block identifier; and when determining that the volume location of the address metadata is a base volume, obtaining the address metadata from the base volume based on the data block identifier; and correspondingly, the querying historical index information based on the data block identifier and the first time sequence identifier includes: when determining that the volume location of the address metadata is a snapshot volume, querying the historical index information based on the data block identifier and the first time sequence identifier. In the foregoing possible implementation, whether the volume location of the address metadata corresponding to the data block identifier is the base volume or the snapshot volume may be rapidly determined based on the location identification information, and the metadata is queried from the base volume or the snapshot volume, so that query efficiency may be improved, and storage space for the historical index information is reduced.

In at least one embodiment, the location identification information includes at least one data block identifier and a latest snapshot time sequence identifier corresponding to each of the at least one data block identifier, and the method further includes: when the data block identifier exists in the location identification information, and the first time sequence identifier is less than the latest snapshot time sequence identifier corresponding to the data block identifier, determining that the volume location of the address metadata is the snapshot volume.

In at least one embodiment, when the data block identifier does not exist in the historical index information, or the data block identifier exists in the historical index information, and the first time sequence identifier is not in the query time sequence interval corresponding to the data block identifier, the method further includes: performing searching from the first snapshot volume level by level to determine a volume identifier of a third snapshot volume in which the address metadata corresponding to the data block identifier is located and a target time sequence interval; and updating the historical index information based on a correspondence between the target time sequence interval, and the data block identifier and the volume identifier of the third snapshot volume. In the foregoing possible implementation, the volume identifier of the third snapshot volume in which the address metadata corresponding to the data block identifier is located and the target time sequence interval are determined through searching level by level, and the historical index information is updated based on this, so that time overheads for searching for the address metadata again subsequently may be reduced, and the metadata searching efficiency is improved.

In at least one embodiment, the historical index information includes M partitions, each partition is used to store N query records, and one query record includes a correspondence between a historical data block identifier, and the query volume identifier and the query time sequence interval, where M and N are positive integers. In the foregoing possible implementation, efficiency of querying the historical index information may be improved by partitioning the historical index information, thereby reducing a metadata searching time and improving query efficiency.

In at least one embodiment, the updating the historical index information based on a correspondence between the target time sequence interval, and the data block identifier and the volume identifier of the third snapshot volume includes: when a quantity of query records included in a first partition of the M partitions is less than N, storing the correspondence between the target time sequence interval, and the data block identifier and the volume identifier of the third snapshot volume in the first partition. In the foregoing possible implementation, the historical index information is updated based on a query result, so that time overheads for searching for the address metadata again subsequently may be reduced, and the metadata searching efficiency is improved.

In at least one embodiment, the updating the historical index information based on a correspondence between the target time sequence interval, and the data block identifier and the volume identifier of the third snapshot volume includes: when a quantity of query records included in a first partition of the M partitions is equal to N, and a target query hop count in the target time sequence interval is greater than a query hop count in the N query records included in the first partition, replacing a query record having a minimum query hop count in the first partition with the correspondence between the target time sequence interval, and the data block identifier and the volume identifier of the third snapshot volume. In the foregoing possible implementation, a query record having a relatively small query hop count in the historical index information is replaced based on a query result, so that time overheads for searching for metadata having a relatively large query hop count may be reduced, and the metadata searching efficiency is improved.

In at least one embodiment, the updating the historical index information based on a correspondence between the target time sequence interval, and the data block identifier and the volume identifier of the third snapshot volume includes: when a quantity of query records included in a first partition of the M partitions is equal to N, and a target query hop count in the time sequence interval is less than a query hop count in the N query records included in the first partition, storing the correspondence between the target time sequence interval, and the data block identifier and the volume identifier of the third snapshot volume in a second partition. In the foregoing possible implementation, the historical index information is updated based on a query result, so that time overheads for searching for the address metadata again subsequently may be reduced, and the metadata searching efficiency is improved.

In at least one embodiment, when no query record is stored in the second partition, storage space corresponding to the second partition is empty, and before the storing the correspondence between the target time sequence interval, and the data block identifier and the volume identifier of the third snapshot volume in a second partition, the method further includes: allocating, to the second partition, storage space used to store N query records. In the foregoing possible implementation, when the query record does not need to be stored in the second partition, the storage space is not allocated to the second partition; and when the query record needs to be stored in the second partition, the storage space is allocated to the second partition. In this way, storage utilization may be improved and a waste of storage space is avoided.

In at least one embodiment, each of the M partitions corresponds to one hop count threshold, and a query hop count in N query records stored in one partition is greater than or equal to a hop count threshold corresponding to the partition. In the foregoing possible implementation, each of the M partitions corresponds to one hop count threshold, so that efficiency of querying the historical index information may be improved, thereby reducing time overheads for searching for metadata and improving metadata query efficiency.

According to at least one embodiment, a metadata query apparatus is provided. The apparatus is applied to a linked snapshot, and includes: a receiving unit, configured to receive a metadata query request, where the metadata query request includes a volume identifier of a first snapshot volume and a data block identifier; an obtaining unit, configured to obtain a first time sequence identifier from the first snapshot volume based on the volume identifier of the first snapshot volume, where the first time sequence identifier is used to indicate a creation time sequence of the first snapshot volume; and a query unit, configured to query historical index information based on the data block identifier and the first time sequence identifier, where the historical index information includes a correspondence between a query data block identifier and historical query snapshot information, where the obtaining unit is further configured to: when the data block identifier exists in the historical index information, and the first time sequence identifier falls within a corresponding query time sequence interval, obtain a corresponding target volume identifier from the historical index information, and obtain, from a second snapshot volume indicated by the target volume identifier, address metadata corresponding to the data block identifier.

In at least one embodiment, the historical query snapshot information includes at least one query volume identifier and a query time sequence identifier and a query hop count that correspond to each query volume identifier, and the query time sequence identifier and the query hop count are used to indicate the query time sequence interval.

In at least one embodiment, the query unit is further configured to query location identification information based on the data block identifier, where the location identification information is used to indicate a volume location of the address metadata corresponding to the data block identifier; and the obtaining unit is further configured to: when determining that the volume location of the address metadata is a base volume, obtain the address metadata from the base volume based on the data block identifier; and correspondingly, the query unit is further configured to: when determining that the volume location of the address metadata is a snapshot volume, query the historical index information based on the data block identifier and the first time sequence identifier.

In at least one embodiment, the location identification information includes at least one data block identifier and a latest snapshot time sequence identifier corresponding to each of the at least one data block identifier, and the query unit is further configured to: when the data block identifier exists in the location identification information, and the first time sequence identifier is less than the latest snapshot time sequence identifier corresponding to the data block identifier, determine that the volume location of the address metadata is the snapshot volume.

In at least one embodiment, the query unit is further configured to: when the data block identifier does not exist in the historical index information, or the first time sequence identifier is not in the corresponding query time sequence interval, perform searching from the first snapshot volume level by level to determine a volume identifier of a third snapshot volume in which the address metadata corresponding to the data block identifier is located and a target time sequence interval; and the apparatus further includes an updating unit, configured to update the historical index information based on a correspondence between the target time sequence interval, and the data block identifier and the volume identifier of the third snapshot volume.

In at least one embodiment, the historical index information includes M partitions, each partition is used to store N query records, and one query record includes a correspondence between a historical data block identifier, and the query volume identifier and the query time sequence interval, where M and N are positive integers.

In at least one embodiment, the updating unit is further configured to: when a quantity of query records included in a first partition of the M partitions is less than N, store the correspondence between the target time sequence interval, and the data block identifier and the volume identifier of the third snapshot volume in the first partition.

In at least one embodiment, the updating unit is further configured to: when a quantity of query records included in a first partition of the M partitions is equal to N, and a target query hop count in the target time sequence interval is greater than a query hop count in the N query records included in the first partition, replace a query record having a minimum query hop count in the first partition with the correspondence between the target time sequence interval, and the data block identifier and the volume identifier of the third snapshot volume.

In at least one embodiment, the updating unit is further configured to: when a quantity of query records included in a first partition of the M partitions is equal to N, and a target query hop count in the time sequence interval is less than a query hop count in the N query records included in the first partition, store the correspondence between the target time sequence interval, and the data block identifier and the volume identifier of the third snapshot volume in a second partition.

In at least one embodiment, when no query record is stored in the second partition, storage space corresponding to the second partition is empty, and the apparatus further includes an allocation unit, configured to allocate, to the second partition, storage space used to store N query records.

In at least one embodiment, each of the M partitions corresponds to one hop count threshold, and a query hop count in N query records stored in one partition is greater than or equal to a hop count threshold corresponding to the partition.

According to at least one embodiment, a device is provided. The device includes a memory, a processor, a bus, and a communications interface. The memory stores code and data, the processor is connected to the memory by using the bus, and the processor runs the code in the memory, to enable the device to perform the metadata query method according to any one of the embodiments described herein.

According to at least one embodiment, a computer-readable storage medium is provided. The computer-readable storage medium stores an instruction, and when the instruction is run on a computer, the computer is enabled to perform the metadata query method according to any one of the embodiments described herein.

According to at least one embodiment, a computer program product including an instruction is provided. When the computer program product is run on a computer, the computer is enabled to perform the metadata query method according to any one of the embodiments described herein.

It can be understood that, any one of the apparatus of the metadata query method, the computer storage medium, or the computer program product provided above is configured to perform the corresponding method provided above. Therefore, for beneficial effects that can be achieved by the metadata query apparatus, the computer storage medium, or the computer program product, refer to the beneficial effects in the corresponding method provided above, and details are not described herein again.

DESCRIPTION OF EMBODIMENTS

Snapshot (is an indispensable function, and almost all cloud storage, such as AWS and Alibaba Cloud, supports the snapshot function. A snapshot provides an image of a system at a time point, and may enable the system to restore to a state at an available time point when the system is faulty. The snapshot may be a fully available copy that is related to a specified data set, and the copy includes an image of corresponding data at a specific time point (e.g., a time point from which the copy starts). The snapshot may be a duplicate or replica of data represented by the snapshot.

In a cloud scenario, a snapshot volume reuses data in a source volume (also referred to as a base volume), so that storage space overheads may be effectively reduced. Most snapshots optimize storage space of snapshot data, for example, a snapshot technology such as redirect-on-write (ROW) or copy-on-write (COW). ROW means that all write operations are redirected to another storage medium during generation of a snapshot. When a snapshot is to be created, data that is in a source medium and that corresponds to all redirected write data since a previous snapshot is copied to generate a snapshot at this time point, and then, the redirected write data is written back to a corresponding location in the source medium, thereby completing a snapshot generation process. COW means that when data is written to a storage medium for the first time, original data is read and written to another storage medium, and then the data is written to the storage medium. However, because of a snapshot feature, data in the snapshot volume is very sparse. Usually, data of a plurality of snapshots generated by using a snapshot technology such as ROW or COW directly points to data of the source volume, or original data that is stored in the source volume. Therefore, due to data sparseness, for a plurality of snapshots of a same source volume, a duplication degree of metadata is very high. The metadata refers to related information used to describe data stored in a volume, including an access permission, a modification time, and an address that are of the data, and the like. Address metadata in the application refers to an address of data. Currently, for a linked snapshot, metadata information of the snapshot may be reduced by sharing metadata, to optimize storage space of metadata in a snapshot volume.

Figure 1:
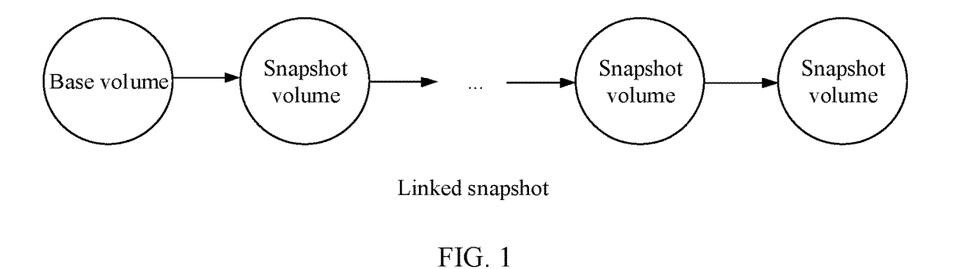
FIG. 1 is a schematic structural diagram of a linked snapshot according to an embodiment of the application.

FIG. 1 is a schematic structural diagram of a linked snapshot according to one embodiment. A structure of the linked snapshot includes a base volume and a snapshot volume. A link includes the base volume and the snapshot volume. A newly created snapshot volume is inserted behind the base volume, and as the snapshot volumes increase, the base volume and the snapshot volumes form a link structure similar to a linked list. Locations of the snapshot volumes in the linked snapshot may be used to indicate a time sequence relationship between snapshot volumes. An earlier creation time indicates a further location of a snapshot volume in the link structure. An embodiment of the application is directed to a linked snapshot of metadata.

Figure 2:
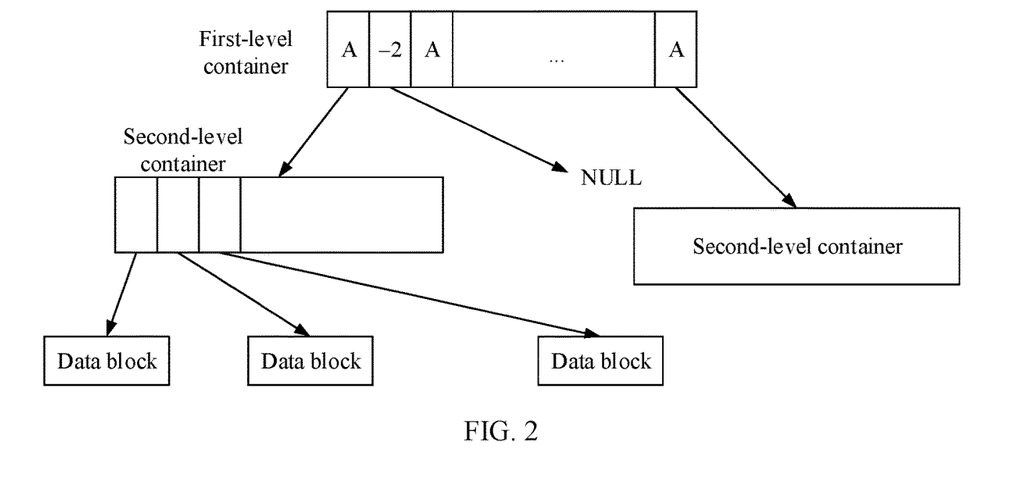
FIG. 2 is a schematic structural diagram of a metadata index of a volume according to an embodiment of the application.

In the linked snapshot, a two-level index mechanism is applied to an index of the metadata in a volume. A second-level index refers to metadata that describes an address of data in a snapshot volume. A first-level index refers to metadata that records an address of the second-level index. Storage units corresponding to the first-level index and the second-level index may be containers. For example, a capacity of each container may be 8 megabytes (MB). As shown in FIG. 2, the container of the first-level index includes a plurality of metadata units, and a size of each metadata unit is 16 bytes (B). A minimum unit of reading and writing may be a metadata unit, and the first-level index may be referred to as a volume container table (VCM). If a second-level index of a snapshot volume shares the metadata in a snapshot chain, the second-level index is represented by using a special identifier (for example, "−2" in FIG. 2). A container of the second-level index may be divided into a plurality of blocks. A size of each block is 4 kilobytes (KB). A minimum unit of reading and writing may be a block. Each block may include approximately 250 metadata units (4 KB/16 B). "A" in FIG. 2 represents an address, that is, represents an address of the container of the second-level index.

In embodiments of the application, values of parameters (for example, the capacity of the container, the size of the metadata unit, and the size of each block) are all examples. One of ordinary skill in the art may understand that the values of the parameters may be adaptively adjusted based on different scenarios. This is not limited in the embodiments of the application.

In the linked snapshot, the base volume has a complete piece of metadata, and the snapshot volume may share the metadatain the base volume and the snapshot chain. The snapshot volume may share the metadata in two manners: First, when an entire container of a second-level index of a snapshot volume does not have private metadata, but shares metadata in a base volume and a snapshot chain, the second-level index is identified by using a special identifier (for example, "−2" in FIG. 2), and the container of the second-level index does not apply for storage space, for example, "NULL" in FIG. 2. Second, when a container of a second-level index of a snapshot volume has some private metadata, only the private metadata is written into the container of the second-level index.

In the linked snapshot, incremental metadata information after a previous snapshot point is recorded in information. Therefore, metadata space is saved. However, the incremental metadata information stored on snapshot metadata cannot overwrite all metadata in many cases. A plurality of snapshot volumes and base volumes need to be searched for a specific piece of metadata based on a dependency. Consequently, time overheads for searching are relatively large. In the embodiments of the application, historical index information is used. The historical index information stores metadata information found in a previous period of time. Therefore, the historical index information may be directly searched for metadata next time. In this way, searching is prevented from being performed level by level from the snapshot volume to the base volume, so that a searching time is dramatically reduced. In addition, a capacity of storage space used to store the historical index information may be limited. Therefore, in the embodiments of the application, the historical index information stores metadata information that consumes a relatively long time in historical search (or has a relatively large query hop count). In this way, storage space of metadata is saved, and metadata query efficiency is improved.

Figure 3:
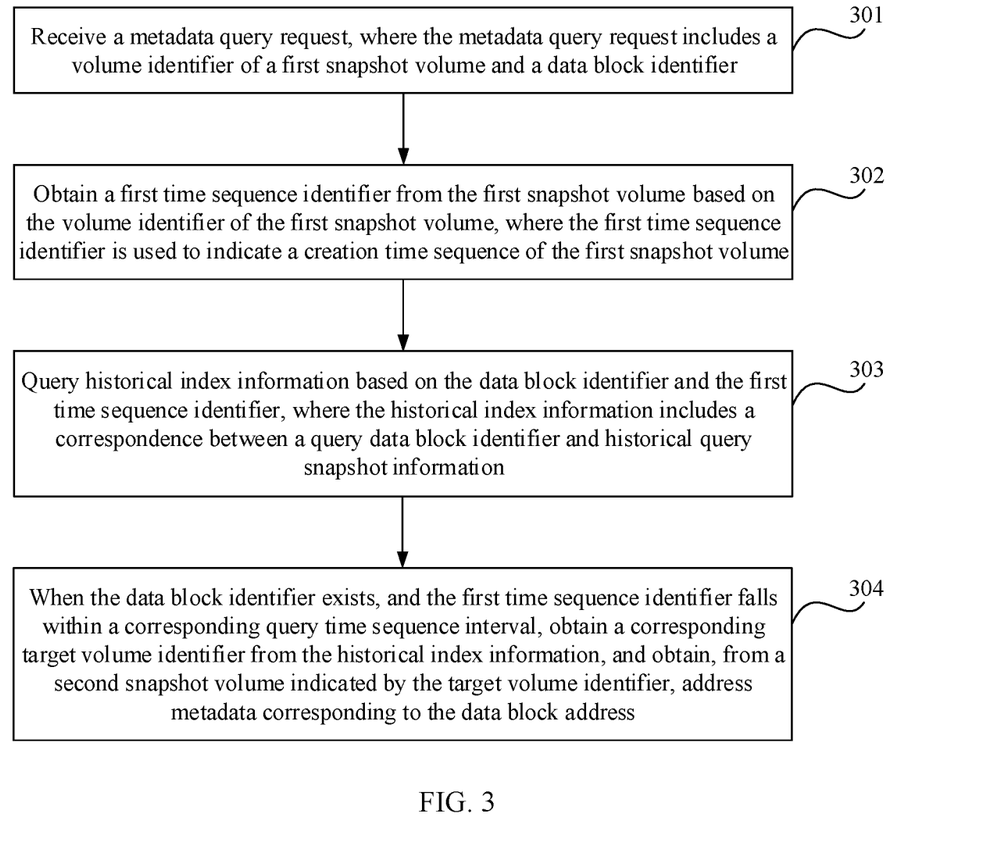
FIG. 3 is a schematic flowchart of a metadata query method according to an embodiment of the application.

FIG. 3 is a schematic flowchart of a metadata query method according to an embodiment of the application. Referring to FIG. 3, the method is applied to an electronic device for managing a linked snapshot, and the method includes the following several operations.

Operation 301: Receive a metadata query request, where the metadata query request includes a volume identifier of a first snapshot volume and a data block identifier.

The electronic device for managing a linked snapshot may be a server, a management device, or the like. The electronic device may be configured to manage and maintain a base volume and a snapshot volume, for example, manage metadata in the base volume and the snapshot volume, create or delete a snapshot volume, and manage data blocks of the base volume and the snapshot volume.

In addition, when a linked snapshot-based upper-layer application (for example, a file system or a database) performs I/O reading/writing or queries information (for example, queries a volume size), and needs to query metadata of the base volume or the snapshot volume, a corresponding metadata query procedure is triggered, so that the electronic device for managing a linked snapshot receives the metadata query request. The metadata query request includes the volume identifier of the first snapshot volume and the data block identifier. The volume identifier of the first snapshot volume is a volume identifier of a snapshot volume currently used by the upper-layer application. The metadata query request is used to query address metadata of a data block indicated by the data block identifier, that is, an address of storage space used to store the data block.

In an embodiment, when the metadata query request is received, address metadata corresponding to the data block identifier may be first queried from the first snapshot volume based on the volume identifier of the first snapshot volume. If the address metadata is in the first snapshot volume, the address metadata corresponding to the data block identifier is directly obtained from the first snapshot volume. If the address metadata is not in the first snapshot volume, it indicates that the address metadata is metadata shared by the first snapshot volume from the base volume or a snapshot volume generated after the first snapshot volume, and the address metadata is located in the base volume or the snapshot volume created after the first snapshot volume. In this case, the following operation 302 is performed.

Operation 302: Obtain a first time sequence identifier from the first snapshot volume based on the volume identifier of the first snapshot volume, where the first time sequence identifier is used to indicate a creation time sequence of the first snapshot volume.

During creation of each snapshot volume, a volume identifier and a time sequence identifier are allocated to the snapshot volume. A volume identifier of a snapshot volume is used to identify the snapshot volume, and a time sequence identifier of a snapshot volume is used to indicate a creation time sequence of the snapshot volume. The volume identifier and the time sequence identifier may be stored in a corresponding snapshot volume. In an embodiment, the electronic device may determine the first snapshot volume based on the volume identifier of the first snapshot volume included in the metadata query request, and obtain the creation time sequence of the first snapshot volume from the first snapshot volume, that is, the first time sequence identifier.

Figure 4:
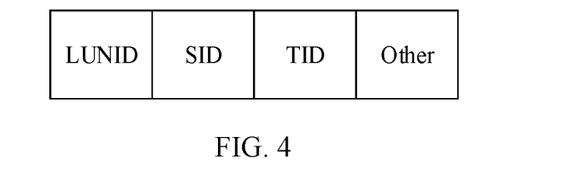
FIG. 4 is a schematic structural diagram of a metadata organization of a snapshot volume according to an embodiment of the application.

For example, FIG. 4 shows a metadata organization of a snapshot volume. In FIG. 4, LUNID is a volume identifier of a base volume, and is used to identify storage space for storing metadata; SID is a volume identifier of a snapshot volume, and is used to uniquely identify the snapshot volume; and TID is a time sequence identifier of the snapshot volume, and is used to identify a creation time sequence of the snapshot volume. A sequence of creating a plurality of snapshot volumes may be determined based on time sequence identifiers of the plurality of different snapshot volumes. Other in FIG. 4 is used to represent other metadata information of the snapshot volume, for example, address metadata of data in the snapshot volume and an access permission of the snapshot volume.

Operation 303: Query historical index information based on the data block identifier and the first time sequence identifier, where the historical index information includes a correspondence between a query data block identifier and historical query snapshot information, and the historical query snapshot information is used to indicate a query volume identifier and a query time sequence interval.

The historical index information is historical query record information, that is, related information of some metadata that has been queried before current metadata is searched for, and an address of storage space corresponding to the historical index information may be stored in the base volume, so that the electronic device may directly obtain the address of the storage space from the base volume, and read the historical index information based on the address of the storage space, so as to query the historical index information based on the data block identifier and the first time sequence identifier. In addition, the base volume may also store other related information of the historical index information. This is not limited in an embodiment of the application.

Figure 5:
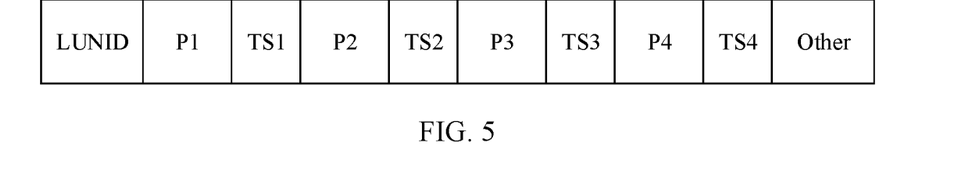
FIG. 5 is a schematic structural diagram of a metadata organization of a base volume according to an embodiment of the application.

For example, FIG. 5 shows a metadata organization of a base volume. In FIG. 5, an example in which historical index information includes four partitions is used for description, and each partition corresponds to one hop count threshold. In FIG. 5, LUNID is used to identify storage space for storing metadata of the base volume; P1, P2, P3, and P4 each are used to indicate an address of storage space occupied by each of the four partitions of the historical index information; TS1, TS2, TS3, and TS4 are respectively used to indicate the hop count thresholds corresponding to the four partitions; and other is used to represent other metadata information of the base volume, for example, address metadata of data in the base volume and an access permission of the data in the base volume.

It should be noted that, for detailed descriptions about the plurality of partitions included in the historical index information and the hop count threshold that corresponds to each partition, refer to related descriptions in the following operation 306. Details are not described in the embodiment of the application.

In addition, the historical index information may include the correspondence between the query data block identifier and the historical query snapshot information, and the historical query snapshot information is used to indicate the query volume identifier and the query time sequence interval. In an embodiment, the historical query snapshot information may include at least one query volume identifier and a query time sequence identifier and a query hop count that correspond to each of the at least one query volume identifier, and the query time sequence identifier and the query hop count may be used to indicate the query time sequence interval. A query time sequence identifier corresponding to a query volume identifier is used to indicate a creation time sequence of a snapshot volume corresponding to the query volume identifier. For example, if a query volume identifier is SID1, and a query time sequence identifier corresponding to the query volume identifier is TID_10, TID_10 may be used to indicate that a creation time sequence of a snapshot volume identified by SID1 is the tenth created snapshot volume. A query hop count corresponding to a query volume identifier is used to indicate a quantity of snapshot volumes that are searched for during query of metadata corresponding to a current historical query record. One snapshot volume that has been searched for may be recorded as one hop. For example, a query hop count is 5, it indicates that the quantity of snapshot volumes that are searched for during query of the metadata corresponding to the current historical query record is 5. A query time sequence interval determined based on the query time sequence identifier TID_10 and the query hop count, which is 5, may be [TID_5, TID_10].

Figure 6:
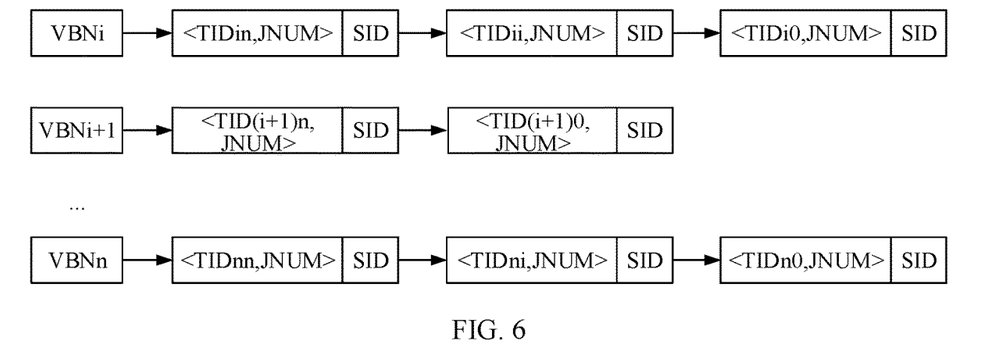
FIG. 6 is a schematic structural diagram of historical index information according to an embodiment of the application.

For example, FIG. 6 is a schematic diagram of historical index information according to one embodiment. A correspondence between a data block identifier and historical query snapshot information in the historical index information may include four elements, which are a data block identifier (VBN), a query time sequence identifier TID, a query volume identifier SID, and a query hop count JNUM. One piece of historical query snapshot information may include one or more query records. For example, in FIG. 6, historical query snapshot information corresponding to a data block VBNi includes three query records, historical query snapshot information corresponding to VBNi+1 includes two query records, and historical query snapshot information corresponding to VBNn includes three query records. Each query record includes a query time sequence identifier TID, a query volume identifier SID, and a query hop count JNUM. Optionally, when SID is set based on a creation time sequence of a snapshot volume, SID may be used to identify the creation time sequence of the snapshot volume, so that TID and SID may be combined into one identifier.

For example, in FIG. 6, the data block VBNi is VBN3, and three query records corresponding to VBN3 may be shown as follows:
VBN3 {<TID_100],50>|SID3<TID_30, 10>|SID2<TID_10,10>|SID1}.

Query time sequence intervals in the three query records corresponding to VBN3 may respectively be [TID_50, TID_100], [TID_20, TID_30], and [TID_0, TID_10].

During actual application, the historical index information may be empty during initial query, that is, no historical query record exists. When searching for metadata, the electronic device may query corresponding address metadata according to the prior art, and store related information of the queried metadata in the historical index information. After a period of time, a plurality of historical query records are stored in the historical index information. Therefore, when querying the metadata, the electronic device may first query the historical index information.

In an embodiment, when the electronic device queries the historical index information based on the data block identifier and the first time sequence identifier, if the data block identifier exists in the historical index information, and the first time sequence identifier falls within the query time sequence interval corresponding to the data block identifier, operation 304 is performed.

Operation 304: When the data block identifier exists in the historical index information, and the first time sequence identifier falls within a query time sequence interval corresponding to the data block identifier, obtain a corresponding target volume identifier from the historical index information, and obtain, from a second snapshot volume indicated by the target volume identifier, address metadata corresponding to the data block identifier.

When the data block identifier exists in the historical index information, and the first time sequence identifier falls within the query time sequence interval corresponding to the data block identifier, it is identified that the address metadata corresponding to the data block identifier has been searched for before and is stored in the historical index information. Therefore, the electronic device may determine corresponding historical query snapshot information based on the data block identifier, and then determine the query time sequence interval in which the first time sequence identifier is located in the corresponding historical query snapshot information. Subsequently, the target volume identifier corresponding to the query time sequence interval in which the first time sequence identifier is located is obtained from the corresponding historical query snapshot information. If the target volume identifier is a volume identifier of the second snapshot volume, the address metadata corresponding to the data block identifier is obtained from the second snapshot volume. For example, in the metadata query request, if the volume identifier is SID7, and the data block identifier is VBN3, an obtained time sequence identifier of SID7 is TID_25. Query time sequence intervals corresponding to VBN3 in the historical index information include: [TID_50, TID_100], [TID_20, TID 30], and [TID_10, TID_0]. The time sequence identifier TID_25 is exactly located in the query time sequence interval [TID_20, TID_30], and a volume identifier corresponding to the query time sequence interval is SID2, so that corresponding metadata is obtained from a snapshot volume indicated by SID2.

Figure 7:
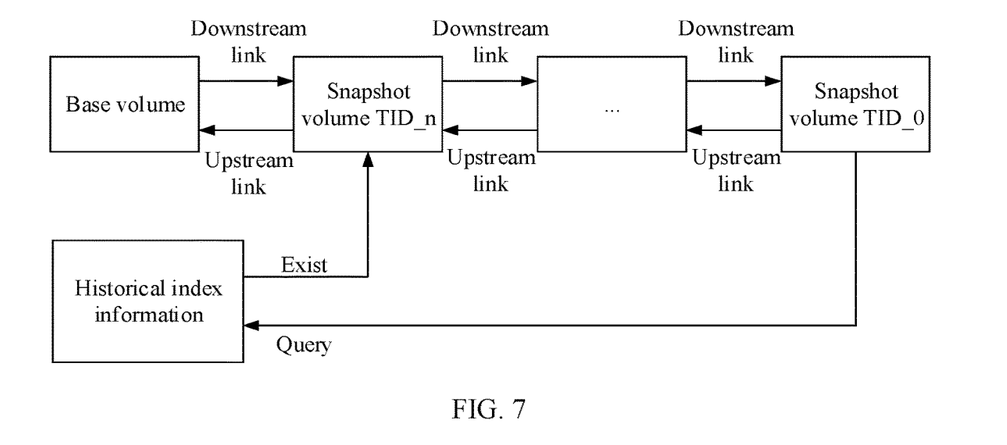
FIG. 7 is a schematic diagram of searching for address metadata according to an embodiment of the application.

For example, FIG. 7 is a schematic diagram of querying metadata in a linked snapshot of metadata according to one embodiment. A link from a base volume to a snapshot volume is referred to as a downstream link, and a link from the snapshot volume to the base volume is referred to as an upstream link. It is assumed that there are 100 snapshot volumes in FIG. 7, volume identifiers corresponding to the 100 snapshot volumes are respectively SID1 to SID100, and corresponding time sequence identifiers are respectively TID_0 to TID_100. An example in which a data block identifier included in a received metadata query request is VBN3 and a volume identifier of a first snapshot volume is SID50 is used for description. In an embodiment of the application, a method for searching for metadata may be as follows: The electronic device searches, from the first snapshot volume indicated by SID50, for address metadata corresponding to the data block identifier VBN3. If the address metadata is not found, a first time sequence identifier TID_50 is obtained from the first snapshot volume. If the data block identifier VBN3 included in the historical index information and historical query snapshot information corresponding to the data block identifier VBN3 are VBN3 {<TID_60. 20]>|SID60}, and when a query time sequence interval indicated by a query time sequence identifier TID_60 and a query hop count 20 is [TID_40, TID_60], it may be determined that VBN3 exists in the historical index information, and the first time sequence identifier TID_50 falls within the query time sequence interval [TID_40, TID_60]. Therefore, a target volume identifier obtained from the historical index information is SID60. In this way, the address metadata corresponding to the data block identifier VBN3 is obtained from a snapshot volume indicated by SID60 (that is, the 60$^{th}$ snapshot volume).

In the prior art, a process of searching for the metadata may be as follows: A first snapshot volume indicated by SID50 (that is, the 50$^{th}$ snapshot volume) is searched for address metadata corresponding to the data block identifier VBN3. If the address metadata is not found, the $51^{st}$ snapshot volume, the $52^{nd}$ snapshot volume, . . . , and the $60^{th}$ snapshot volume are searched for level by level along the direction of the upstream link, thereby obtaining the corresponding address metadata in the $60^{th}$ snapshot volume.

Further, after it is determined that the address metadata that needs to be searched for is in the snapshot volume indicated by SID60, an address of a second-level container in which the address metadata is located (that is, A in the first-level container in FIG. 2) may be determined, based on the data block identifier VBN3, in a first-level index of the metadata in the snapshot volume indicated by SID60. Then, the corresponding address metadata (that is, a data block in the second-level container in FIG. 2) is determined based on the data block identifier VBN3 and the address of the second-level container. For example, VBN3 is represented by using an 8-bit binary number. The first two bits are used to indicate A in the first-level container, and the last six bits are used to indicate data blocks in the second-level container. Therefore, a data block in which the corresponding address metadata is located may be obtained.

Therefore, according to the method provided in an embodiment of the application, when corresponding metadata information exists in the historical index information, a snapshot volume in which the address metadata is located may be directly determined, so that corresponding address metadata is directly obtained from the snapshot volume, thereby avoiding a problem of performing searching level by level according to the prior art, reducing a searching time, and improving metadata query efficiency.

In an embodiment of the application, when receiving the metadata query request, the electronic device may first query the historical index information, and when the data block identifier exists in the historical index information, and the first time sequence identifier falls within the query time sequence interval corresponding to the data block identifier, the electronic device obtains the corresponding target volume identifier from the historical index information, and obtains the address metadata corresponding to the data block identifier from the second snapshot volume indicated by the target volume identifier. Therefore, because the address metadata is obtained based on the historical index information, a problem of performing searching level by level according to the prior art may be avoided. In this way, a searching time is reduced and metadata searching efficiency is improved.

Further, before operation 303, the method may further include operation 3021.

Operation 3021: Query location identification information based on the data block identifier, where the location identification information is used to indicate a volume location of the address metadata corresponding to the data block identifier.

The location identification information may include at least one data block identifier and a latest snapshot time sequence identifier corresponding to each of the at least one data block identifier. Correspondingly, before the location identification information is queried based on the data block identifier, whether the data block identifier exists in the location identification information may be first queried. If the data block identifier exists in the location identification information, the corresponding latest snapshot time sequence identifier is obtained from the location identification information based on the data block identifier. When the first time sequence identifier is less than the obtained latest snapshot time sequence identifier, it is determined that the volume location of the address metadata to be searched for is a snapshot volume; and when the first time sequence identifier is greater than the obtained latest snapshot time sequence identifier, it is determined that the volume location of the address metadata to be searched for is a base volume. If the data block identifier does not exist in the location identification information, it is determined that the volume location of the address metadata to be searched for is the base volume.

For example, when performing a push operation on the base volume, the electronic device may record a time sequence TID_new of a latest snapshot volume in which a data block corresponding to the push operation is located, to form the location identification information. For example, <VBN, TID_new> is used to represent the location identification information, and is stored in the base volume. When the latest time sequence identifier corresponding to the data block identifier exists in the location identification information, a corresponding identification method may be as follows: The electronic device may determine sizes of TID_snap and TID_new based on the obtained time sequence identifier TID_snap of the first snapshot volume. When TID_snap is less than TID_new, it is determined that the address metadata to be searched for is in the snapshot volume. When TID_snap is greater than TID_new, it is determined that the address metadata to be searched for is in the base volume, and the base volume is directly searched for the corresponding address metadata.

Optionally, the location identification information may be stored in the base volume, so that the location identification information may be read from the base volume when the location identification information is queried based on the data block identifier, and the location identification information is further queried based on the data block identifier.

In an embodiment, when it is determined that the volume location of the address metadata is the base volume, the corresponding address metadata may be directly obtained from the base volume. When it is determined that the volume location of the address metadata is the snapshot volume, operation 303 is performed, that is, operation 303 is as follows: when determining that a volume location of address metadata to be searched for is a snapshot volume, querying the historical index information based on the data block identifier and the first time sequence identifier.

In an embodiment of the application, the volume location of the address metadata to be searched for may be determined based on the location identification information. When the volume location is the base volume, the corresponding address metadata may be directly obtained from the base volume; and when the volume location is the snapshot volume, the corresponding address metadata may be directly obtained based on the historical index information, to quickly identify, based on the location identification information, the volume location of the address metadata to be searched for, thereby improving metadata query efficiency, reducing a requirement for the historical index information, and further improving query efficiency of the historical index information.

Figure 8:
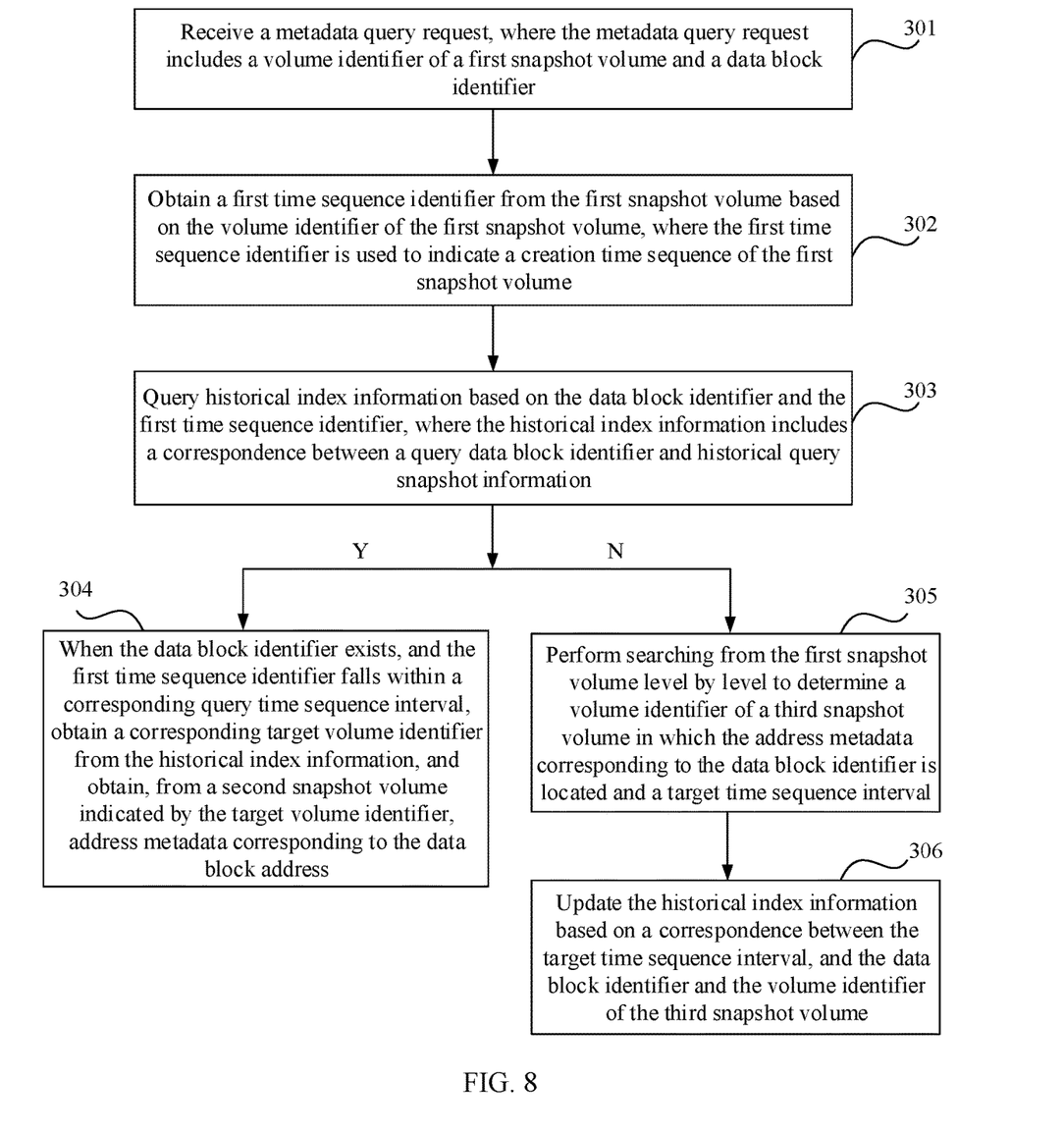
FIG. 8 is a schematic flowchart of another metadata query method according to an embodiment of the application.

Further, referring to FIG. 8, after operation 303, if it is determined that the data block identifier does not exist in the historical index information, or it is determined that the data block identifier exists in the historical index information, but the first time sequence identifier is not in the query time sequence interval corresponding to the data block identifier, the method further includes operation 305 and operation 306.

Operation 305: Perform searching from the first snapshot volume level by level to determine a volume identifier of a third snapshot volume in which the address metadata corresponding to the data block identifier is located and a target time sequence interval.

When the data block identifier does not exist in the historical index information, or it is determined that the data block identifier exists in the historical index information, but the first time sequence identifier is not in the query time sequence interval corresponding to the data block identifier, the electronic device may perform searching from the first snapshot volume level by level to the base volume according to the prior art, to obtain the address metadata corresponding to the data block identifier, and determine the volume identifier of the third snapshot volume in which the address metadata corresponding to the data block identifier is located and the target time sequence interval during the level-by-level search process. The target time sequence interval may be determined based on a time sequence identifier of the third snapshot volume and a quantity of snapshot volumes searched in the level-by-level search process. The quantity of the searched snapshot volumes may also be referred to as a target query hop count, that is, a hop count between the first snapshot volume and the third snapshot volume. For example, the volume identifier of the third snapshot volume is SID4, the time sequence identifier is TID_15, and a corresponding query hop count is 10. The corresponding target time sequence interval determined based on the time sequence identifier TID_15 and the query hop count 10 is [TID_5, TID_15].

Operation 306: Update the historical index information based on a correspondence between the target time sequence interval, and the data block identifier and the volume identifier of the third snapshot volume.

When the volume identifier of the third snapshot volume in which the address metadata corresponding to the data block identifier is located and the target time sequence interval are determined based on operation 305, the electronic device may update the historical index information based on the correspondence between the target time sequence interval, and the data block identifier and the volume identifier of the third snapshot volume. In this way, when querying the address metadata again subsequently, the electronic device may directly obtain the address metadata from the historical index information, thereby avoiding a prior-art trouble of level-by-level query, and reducing a searching time.

Further, the historical index information may include M partitions (for example, four partitions), that is, storage space used to store the historical index information may be divided into M partitions, and each partition may be used to store N query records, where M and N are positive integers. One query record may include a correspondence between a historical data block identifier, and the query volume identifier and the query time sequence interval. When the M partitions are divided for the historical index information, storage space may be allocated to each partition in advance, or in a metadata query process, storage space may be gradually allocated to the M partitions as a quantity of query records in historical query information increases.

For example, if M is 4 and a size of the partition is 8 MB, 8 MB of storage space may be allocated to each of the four partitions in advance. Alternatively, 8 MB of storage space is first allocated to a first partition in the four partitions, and when a quantity of query records stored in the first partition reaches an upper limit, 8 MB of storage space is then allocated to a second partition, and corresponding storage space is sequentially allocated to a third partition and a fourth partition in a same manner.

In addition, each partition may correspond to one hop count threshold, that is, a query hop count in a query record stored in one partition is greater than or equal to a hop count threshold of the partition. Hop count thresholds corresponding to the M partitions are set according to a specific rule. For example, the hop count thresholds are set in descending order, and a difference between hop count thresholds corresponding to two adjacent partitions may be fixed. For example, the first partition and the second partition are used as an example. A hop count threshold of the first partition may be 20, and a hop count threshold of the second partition may be 15. Therefore, a query hop count in query records stored in the first partition is greater than or equal to 20, and a query hop count in query records stored in the second partition is greater than or equal to 15 and less than 20.

Further, a process in which the electronic device updates the historical index information based on the correspondence between the target time sequence interval, and the data block identifier and the volume identifier of the third snapshot volume is related to the query records stored in the historical index information and the storage space of the historical index information. Details are described below.

For any of the M partitions, for example, the first partition, when a quantity of query records stored in the first partition does not reach the upper limit, that is, when the quantity of query records included in the first partition is less than N, the electronic device may use the correspondence between the target time sequence interval, and the data block identifier and the volume identifier of the third snapshot volume as a query record and stores the query record in the first partition.

When the quantity of query records stored in the first partition reaches the upper limit, that is, the quantity of query records included in the first partition is equal to N, and the target query hop count is greater than a query hop count of each of the N query records included in the first partition, the electronic device may replace a query record having a minimum query hop count in the first partition with the correspondence between the target time sequence interval, and the data block identifier and the volume identifier of the third snapshot volume. In addition, the electronic device may further store, in the second partition, the query record having the minimum query hop count in the first partition, that is, store the replaced query record in the first partition in the second partition.

When the quantity of query records stored in the first partition reaches the upper limit, that is, the quantity of query records included in the first partition is equal to N, and the target query hop count is less than the query hop count of each of the N query records included in the first partition, the electronic device directly stores the correspondence between the target time sequence interval, and the data block identifier and the volume identifier of the third snapshot volume in the second partition. Optionally, when the first partition is full, and no query record is stored in the second partition, the storage space corresponding to the second partition may be empty. When the query record needs to be stored in the second partition, the electronic device allocates the corresponding storage space to the second partition. Similarly, corresponding storage space may also be allocated to another partition of the M partitions in a same manner.

In addition, when the electronic device deletes a snapshot volume or performs a push operation, the electronic device may also update the historical index information based on a corresponding operation. For example, when operating a data block VBN, the electronic device may update SID in a query record corresponding to VBN to a volume identifier of a latest snapshot volume in which the data block is located, to ensure accuracy and validity of the historical index information. It should be noted that, when metadata of the base volume is updated, all snapshot volumes still share the original metadata. Therefore, the original metadata cannot be discarded, and needs to be pushed to the latest snapshot volume to continue to maintain a sharing relationship. This metadata pushing process is referred to as the push operation.

In a process of updating the historical index information, when a quantity of query hop counts included in a partition of the historical index information is less than a preset value, the partition may be further disabled, that is, storage space corresponding to the partition is recycled. For example, a partition may store 50 query records. When the preset value is 10, that is, a query hop count actually stored in the partition is less than 10, the partition may be disabled. If another partition stores spare storage space, the query hop count stored in the partition may also be stored in the another partition.

For example, when opening a snapshot volume, the electronic device reads historical index information corresponding to the snapshot volume into a memory. Then, all operations (for example, searching, inserting, and updating) on the historical index information are performed in the memory. When the snapshot volume is closed, the historical index information may be saved, and the historical index information may exit from the memory.

In addition, during actual application, bits for representing the time sequence TID of the snapshot volume may be limited. Therefore, when TID of the snapshot volume reaches an upper limit that can be represented by the bits, the time sequence TID of the snapshot volume may be updated again. In this case, the historical index information may be deleted. By setting a proper maximum time sequence value, a frequency of deleting the historical index information may be controlled. In addition, it is ensured that the historical index information can be continuously updated based on historical searching records at different times, to improve utilization of the historical index information.

The foregoing mainly describes the solutions provided in the embodiments of the application from a perspective of the electronic device, and the electronic device herein may also be referred to as metadata query apparatus. It can be understood that, to implement the foregoing functions, the metadata query apparatus includes a corresponding hardware structure and/or software module for performing each function. One of ordinary skill in the art may be easily aware that, in combination with network elements and algorithms operations of the examples described in the embodiments disclosed in the specification, the application may be implemented by hardware or a combination of hardware and computer software. Whether a function is performed by hardware or software driven by computer software depends on particular applications and design constraints of the technical solutions. One of ordinary skill in the art may use different methods to implement the described functions for each particular application, but it should not be considered that the implementation goes beyond the scope of the application.

In the embodiments of the application, functional modules of the metadata query apparatus may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of the application, module division is exemplary, and is merely a logical function division. During actual implementation, another division manner may be used.

Figure 9:
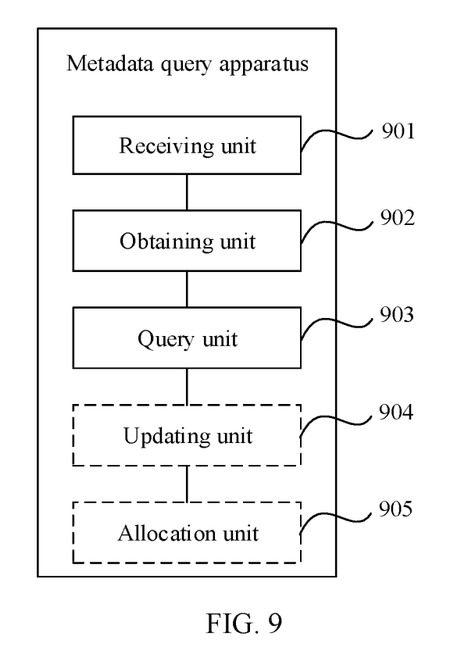
FIG. 9 is a schematic structural diagram of a metadata query apparatus according to an embodiment of the application.

When each functional module is divided corresponding to each function, FIG. 9 is a possible schematic structural diagram of the metadata query apparatus in the foregoing embodiments. The metadata query apparatus includes a receiving unit 901, an obtaining unit 902, and a query unit 903. The receiving unit 901 is configured to support the metadata query apparatus in performing operation 301 in FIG. 3 or FIG. 8. The obtaining unit 902 is configured to support the metadata query apparatus in performing operation 302 and operation 304 in FIG. 3, or operation 302, operation 304, or operation 305 in FIG. 8. The query unit 903 is configured to support the metadata query apparatus in performing operation 303 in FIG. 3 or FIG. 8. Further, the metadata query apparatus further includes an updating unit 904 and an allocation unit 905. The updating unit 904 is configured to support the metadata query apparatus in performing operation 306 in FIG. 8. The allocation unit 905 is configured to support the operation of allocating, by the metadata query apparatus, storage space to the second partition.

In hardware implementation, the obtaining unit 902, the query unit 903, the updating unit 904, and the allocation unit 905 may be processors, and the receiving unit 901 may be a receiver. The receiver and a transmitter may form a communications interface.

Figure 10:
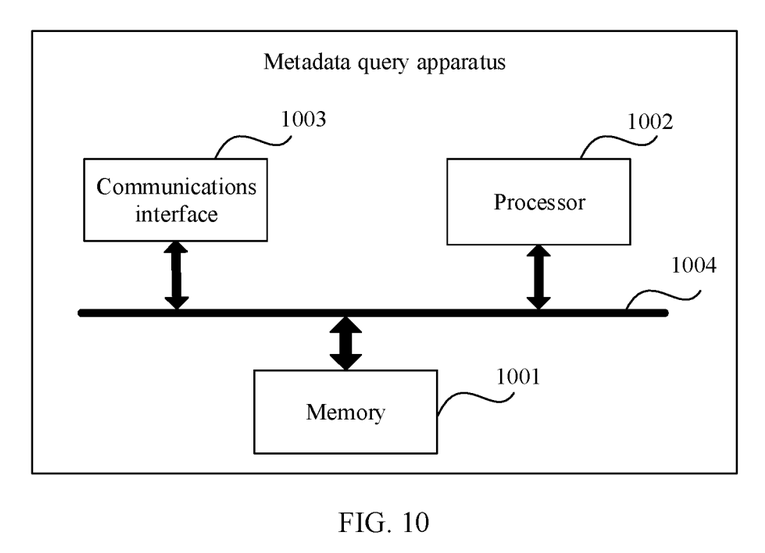
FIG. 10 is a schematic structural diagram of another metadata query apparatus according to an embodiment of the application.

FIG. 10 is a schematic diagram of a possible logic structure of a metadata query apparatus in the foregoing embodiments according to an embodiment of the invention. The metadata query apparatus includes a processor 1002, a communications interface 1003, a memory 1001, and a bus 1004. The processor 1002, the communications interface 1003, and the memory 1001 are connected to each other by using the bus 1004. In an embodiment of the application, the processor 1002 is configured to control and manage an action of the metadata query apparatus. For example, the processor 1002 is configured to support the metadata query apparatus in performing operation 302 to operation 304 in FIG. 3, or operation 302 to operation 306 in FIG. 8, and/or other processes of the technology described in the specification. The communications interface 1003 is configured to support the metadata query apparatus in performing communication. The memory 1001 is configured to store program code and data of the metadata query apparatus.

The processor 1002 may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in the application. Alternatively, the processor may be a combination of processors implementing a computing function, for example, a combination of one or more microprocessors, or a combination of the digital signal processor and a microprocessor. The bus 1004 may be a peripheral component interconnect (PCI) bus, an extended industry standard architecture (EISA) bus, or the like. The bus may be classified into an address bus, a data bus, a control bus, and the like.

For ease of representation, only one thick line is used to represent the bus in FIG. 10, but this does not mean that there is only one bus or only one type of bus.

In another embodiment of the application, a readable storage medium is further provided. The readable storage medium stores a computer executable instruction. When a device (which may be a single-chip microcomputer or a chip) or a processor performs the metadata query method provided in FIG. 3 or FIG. 8, the foregoing readable storage medium may include various media that can store program code, such as a USB flash drive, a removable hard disk, a read-only memory, a random access memory, a magnetic disk, or an optical disc.

In another embodiment of the application, a computer program product is further provided. The computer program product includes a computer executable instruction. The computer executable instruction is stored in a computer readable storage medium. At least one processor of a device may read the computer executable instruction from the computer readable storage medium. The at least one processor executes the computer executable instruction to enable the device to perform the metadata query method provided in FIG. 3 or FIG. 8.

In the embodiments of the application, when the metadata query request is received, the historical index information may be first queried, and when the data block identifier exists in the historical index information, and the first time sequence identifier falls within the query time sequence interval corresponding to the data block identifier, the corresponding target volume identifier is obtained from the historical index information, and the address metadata corresponding to the data block identifier is obtained from the second snapshot volume indicated by the target volume identifier. Because the historical index information stores the correspondence between the query data block identifier and the historical query snapshot information, a problem of performing searching level by level according to the prior art may be avoided. In this way, a searching time is reduced and metadata searching efficiency is improved.

Finally, it should be noted that, the foregoing descriptions are merely implementations of the application, but are not intended to limit the protection scope of the application. Any variation or replacement within the technical scope disclosed in the application shall fall within the protection scope of the application. Therefore, the protection scope of the application shall be subject to the protection scope of the claims.

What is claimed is:

1. A metadata query method; applied to a linked snapshot, the method comprising:
receiving a metadata query request, the metadata query request comprising a volume identifier of a first snapshot volume and a data block identifier;
obtaining a first time sequence identifier from the first snapshot volume based on the volume identifier of the first snapshot volume, wherein the first time sequence identifier is used to indicate a creation time sequence of the first snapshot volume;
querying a historical index information based on the data block identifier and the first time sequence identifier, wherein the historical index information comprises a correspondence between a query data block identifier and a historical query snapshot information, and the historical query snapshot information is used to indicate a query volume identifier and a query time sequence interval; and
when the data block identifier exists in the historical index information, and the first time sequence identifier falls within a corresponding query time sequence interval, obtaining a corresponding target volume identifier from the historical index information, and obtaining, from a second snapshot volume indicated by the target volume identifier, address metadata corresponding to the data block identifier.

2. The method according to claim 1, wherein the historical query snapshot information comprises at least one query volume identifier and a query time sequence identifier and a query hop count that correspond to each query volume identifier, and wherein the query time sequence identifier and the query hop count are used to indicate the query time sequence interval.

3. The method according to claim 1, further comprising before the querying historical index information,
querying a location identification information based on the data block identifier, wherein the location identification information is used to indicate a volume location of the address metadata corresponding to the data block identifier; and
when determining that the volume location of the address metadata is a base volume, obtaining the address metadata from the base volume based on the data block identifier; and
wherein the querying historical index information comprises:
when determining that the volume location of the address metadata is a snapshot volume, querying the historical index information based on the data block identifier and the first time sequence identifier.

4. The method according to claim 3, wherein the location identification information comprises at least one data block identifier and a latest snapshot time sequence identifier corresponding to each of the at least one data block identifier, and wherein the method further comprises:
when the data block identifier exists in the location identification information, and the first time sequence identifier is less than the latest snapshot time sequence identifier corresponding to the data block identifier, determining that the volume location of the address metadata is the snapshot volume.

5. The method according to claim 1 further comprising:
when the data block identifier does not exist in the historical index information, or the first time sequence identifier is not in the corresponding query time sequence interval,
searching from the first snapshot volume level by level to determine a volume identifier of a third snapshot volume in which the address metadata corresponding to the data block identifier is located and a target time sequence interval; and
updating the historical index information based on a correspondence between the target time sequence interval, and the data block identifier and the volume identifier of the third snapshot volume.

6. The method according to claim 5, wherein the historical index information comprises M partitions, wherein each partition is used to store N query records, and wherein one query record comprises a correspondence between a historical data block identifier, and the query volume identifier and the query time sequence interval, wherein M and N are positive integers.

7. The method according to claim 6, further comprising:
when a quantity of query records in a first partition of the M partitions is less than N, storing the correspondence between the target time sequence interval, and the data block identifier and the volume identifier of the third snapshot volume in the first partition.

8. The method according to claim 6, further comprising:
when a quantity of query records in a first partition of the M partitions is equal to N, and a target query hop count in the target time sequence interval is greater than a query hop count in the N query records in the first partition, replacing a query record having a minimum query hop count in the first partition with the correspondence between the target time sequence interval, and the data block identifier and the volume identifier of the third snapshot volume.

9. The method according to claim 6, further comprising:
when a quantity of query records in a first partition of the M partitions is equal to N, and a target query hop count in the target time sequence interval is less than a query hop count in the N query records in the first partition, storing the correspondence between the target time sequence interval, and the data block identifier and the volume identifier of the third snapshot volume in a second partition.

10. The method according to claim 9, wherein when no query record is stored in the second partition, storage space corresponding to the second partition is empty, and wherein the method further comprises before the storing the correspondence between the target time sequence interval, and the data block identifier and the volume identifier of the third snapshot volume in a second partition,
allocating, to the second partition, storage space used to store N query records.

11. A device comprising:
a memory,
a processor,
a bus, and
a communications interface, wherein the memory stores a code and data, wherein the processor is coupled to the memory by using the bus, and wherein the processor is configured to execute the code in the memory to enable the device to perform a method comprising
receiving a metadata query request, the metadata query request comprising a volume identifier of a first snapshot volume and a data block identifier;
obtaining a first time sequence identifier from the first snapshot volume based on the volume identifier of the first snapshot volume, wherein the first time sequence identifier is used to indicate a creation time sequence of the first snapshot volume;
querying a historical index information based on the data block identifier and the first time sequence identifier, wherein the historical index information comprises a correspondence between a query data block identifier and historical query snapshot information, and the historical query snapshot information is used to indicate a query volume identifier and a query time sequence interval; and
when the data block identifier exists in the historical index information, and the first time sequence identifier falls within a corresponding query time sequence interval, obtaining a corresponding target volume identifier from the historical index information, and obtaining, from a second snapshot volume indicated by the target volume identifier, address metadata corresponding to the data block identifier.

12. The device according to claim 11, wherein the historical query snapshot information comprises at least one query volume identifier and a query time sequence identifier and a query hop count that correspond to each query volume identifier, and wherein the query time sequence identifier and the query hop count are used to indicate the query time sequence interval.

13. The device according to claim 11, wherein before the querying historical index information, the processor is further configured to execute the code in the memory to enable the device to perform the method comprising
querying a location identification information based on the data block identifier, wherein the location identification information is used to indicate a volume location of the address metadata corresponding to the data block identifier; and
when determining that the volume location of the address metadata is a base volume, obtaining the address metadata from the base volume based on the data block identifier; and
wherein the querying historical index information comprises:
when determining that the volume location of the address metadata is a snapshot volume, querying the historical index information based on the data block identifier and the first time sequence identifier.

14. The device according to claim 13, wherein the location identification information comprises at least one data block identifier and a latest snapshot time sequence identifier corresponding to each of the at least one data block identifier, and wherein the processor is further comprised to execute the code in the memory to enable the device to perform the method comprising
when the data block identifier exists in the location identification information, and the first time sequence identifier is less than the latest snapshot time sequence identifier corresponding to the data block identifier, determining that the volume location of the address metadata is the snapshot volume.

15. The device according to claim 11, wherein the processor is further configured to execute the code to enable the device to perform the method comprising
when the data block identifier does not exist in the historical index information, or the first time sequence identifier is not in the corresponding query time sequence interval,
searching from the first snapshot volume level by level to determine a volume identifier of a third snapshot volume in which the address metadata corresponding to the data block identifier is located and a target time sequence interval; and
updating the historical index information based on a correspondence between the target time sequence interval, and the data block identifier and the volume identifier of the third snapshot volume.

16. The device according to claim 15, wherein the historical index information comprises M partitions, each partition is used to store N query records, and wherein one query record comprises a correspondence between a historical data block identifier, and the query volume identifier and the query time sequence interval, wherein M and N are positive integers.

17. The device according to claim 16, wherein the processor is further configured to execute the code in the memory to enable the device to perform the method comprising:
when a quantity of query records in a first partition of the M partitions is less than N, storing the correspondence between the target time sequence interval, and the data block identifier and the volume identifier of the third snapshot volume in the first partition.

18. The device according to claim 16, wherein the processor is further configured to execute the code in the memory to enable the device to perform the method comprising:

when a quantity of query records in a first partition of the M partitions is equal to N, and a target query hop count in the target time sequence interval is greater than a query hop count in the N query records in the first partition, replacing a query record having a minimum query hop count in the first partition with the correspondence between the target time sequence interval, and the data block identifier and the volume identifier of the third snapshot volume.

19. The device according to claim 16, wherein the processor is further configured to execute the code in the memory to enable the device to perform the method comprising:

when a quantity of query records in a first partition of the M partitions is equal to N, and a target query hop count in the target time sequence interval is less than a query hop count in the N query records in the first partition, storing the correspondence between the target time sequence interval, and the data block identifier and the volume identifier of the third snapshot volume in a second partition.

20. The device according to claim 19, wherein when no query record is stored in the second partition, storage space corresponding to the second partition is empty, and wherein the processor is further configured to execute the code to enable the device to perform the method comprising:

before the storing the correspondence between the target time sequence interval, and the data block identifier and the volume identifier of the third snapshot volume in a second partition, allocating, to the second partition, storage space used to store N query records.

\* \* \* \* \*

UNITED STATES PATENT AND TRADEMARK OFFICE
CERTIFICATE OF CORRECTION

PATENT NO. : 11,474,972 B2
APPLICATION NO. : 16/831005
DATED : October 18, 2022
INVENTOR(S) : Yong Li, Zhongbing Yang and Yan Tu It is certified that error appears in the above-identified patent and that said Letters Patent is hereby corrected as shown below:

In the Claims

In Claim 14, Column 22, Line 29, delete "further comprised to" and insert --further configured to--.

Signed and Sealed this
Tenth Day of January, 2023

Katherine Kelly Vidal
*Director of the United States Patent and Trademark Office*